March 11, 1952 R. F. STEHLIK 2,588,685

REGISTER-SENDER FOR AUTOMATIC TELEPHONY

Filed April 25, 1947 13 Sheets-Sheet 1

INVENTOR
RUDOLPH FRANK STEHLIK

BY Chas. W. Cauly.
ATTORNEY.

March 11, 1952 R. F. STEHLIK 2,588,685

REGISTER-SENDER FOR AUTOMATIC TELEPHONY

Filed April 25, 1947 13 Sheets-Sheet 2

INVENTOR
RUDOLPH FRANK STEHLIK

BY [signature]

ATTORNEY.

INVENTOR
RUDOLPH FRANK STEHLIK
BY Chas. W. Candy.
ATTORNEY.

March 11, 1952 R. F. STEHLIK 2,588,685

REGISTER-SENDER FOR AUTOMATIC TELEPHONY

Filed April 25, 1947 13 Sheets-Sheet 4

INVENTOR
RUDOLPH FRANK STEHLIK

BY Chas. W. Cosby

ATTORNEY.

INVENTOR
RUDOLPH FRANK STEHLIK
BY Chas. Wm. Candy
ATTORNEY

March 11, 1952 R. F. STEHLIK 2,588,685

REGISTER-SENDER FOR AUTOMATIC TELEPHONY

Filed April 25, 1947 13 Sheets-Sheet 6

INVENTOR
RUDOLPH FRANK STEHLIK

BY Chas. W. Candy
ATTORNEY

| | 1 | 2 | 3 | 4 |
|---|---|---|---|---|
| 1 | X | X | | |
| 2 | X | | X | |
| 3 | X | | | X |
| 4 | | X | X | |
| 5 | | X | | X |
| 6 | | | X | X |
| 7 | X | | | |
| 8 | | X | | |
| 9 | | | X | |
| 0 | | | | X |

INVENTOR
RUDOLPH FRANK STEHLIK
BY [signature]
ATTORNEY.

March 11, 1952 R. F. STEHLIK 2,588,685

REGISTER-SENDER FOR AUTOMATIC TELEPHONY

Filed April 25, 1947 13 Sheets-Sheet 8

INVENTOR
RUDOLPH FRANK STEHLIK
BY Chas. M. Candy
ATTORNEY.

March 11, 1952 R. F. STEHLIK 2,588,685

REGISTER-SENDER FOR AUTOMATIC TELEPHONY

Filed April 25, 1947 13 Sheets-Sheet 9

INVENTOR
RUDOLPH FRANK STEHLIK

BY Chas. W. Candy

ATTORNEY

March 11, 1952 R. F. STEHLIK 2,588,685

REGISTER-SENDER FOR AUTOMATIC TELEPHONY

Filed April 25, 1947 13 Sheets-Sheet 10

INVENTOR
RUDOLPH FRANK STEHLIK
BY
ATTORNEY.

INVENTOR
RUDOLPH FRANK STEHLIK
BY Chas. W. Candy.
ATTORNEY.

March 11, 1952 R. F. STEHLIK 2,588,685

REGISTER-SENDER FOR AUTOMATIC TELEPHONY

Filed April 25, 1947 13 Sheets-Sheet 12

INVENTOR
RUDOLPH FRANK STEHLIK

BY Chas. W. Candy.

ATTORNEY.

March 11, 1952 R. F. STEHLIK 2,588,685
REGISTER-SENDER FOR AUTOMATIC TELEPHONY
Filed April 25, 1947 13 Sheets-Sheet 13

INVENTOR
RUDOLPH FRANK STEHLIK
BY Chas. W. Candy
ATTORNEY.

Patented Mar. 11, 1952 2,588,685

UNITED STATES PATENT OFFICE 2,588,685

REGISTER-SENDER FOR AUTOMATIC TELEPHONY

Rudolph Frank Stehlik, Antwerp, Belgium, assignor to Automatic Electric Laboratories, Inc., Chicago, Ill., a corporation of Delaware Application April 25, 1947, Serial No. 743,964
In Great Britain July 26, 1939

Section 1, Public Law 690, August 8, 1946
Patent expires July 26, 1959

5 Claims. (Cl. 179—18)

The present invention relates to automatic or semi-automatic telephone systems and is more particularly concerned with telephone systems extending over a large area involving somewhat complicated numbering or designation schemes.

For instance a large area may include a number of zones, each having a number of exchanges and in order to set up automatically inter-zone calls between subscribers it will be necessary to transmit a predetermined number of zone-designating digits and a predetermined number of subscriber-designating digits which latter digits include a predetermined number of exchange designating digits. On certain inter-zone calls however variations may occur in said predetermined numbers of digits which gives rise to the necessity of providing means for meeting the condition and it is the object of the invention to provide such means.

According, therefore, to one feature of the invention equipment for controlling the setting up and timing of a connection and the connecting up and operation of a recording arrangement for recording particulars of the connection at the termination thereof is designed to cater for a predetermined number of digits (including a predetermined number of zone-designating and a predetermined number of subscriber-designating digits) and is adapted to respond automatically when specific connections are set up necessitating a modification of one at least of said predetermined numbers of digits to enable the equipment to perform its various functions in the manner necessitated by such specific connections.

On certain inter-zone calls the variation occurs in respect of the number of zone-designating digits and according to a further feature of the invention a register-translator is arranged to control the setting up of connections to other zones in response to a predetermined number of zone-designating digits and when the zone-designating digits for specific connections are less than such predetermined number arrangements are provided whereby the next succeeding digit is employed in the register-translator for zone determination and is also re-transmitted to the desired zone.

According to another feature of the invention a storage device for storing all the necessary particulars of a connection and for controlling the operation of a recording arrangement to record said particulars, the control exerted by said device being such that a distinction is made on the record between the zone designating digits and the local designating digits.

According to yet another feature of the invention a storage device for storing all the necessary particulars of a connection and for controlling the operation of a recording arrangement to record said particulars is designed to cater for a predetermined number of zone-designating digits an indication being given on the record when the last zone-designating digit has been recorded and is adapted to respond automatically when specific connections are set up necessitating a modification in said predetermined number of zone-designating digits to enable the storage device to control the recording arrangement so that said indication is given after the different number of zone-designating digits have been recorded.

On other inter-zone calls particularly special service calls the total number of digits transmitted are varied and according to a still further feature of the invention a register-translator is arranged to control the setting up of connections to other zones in response to a predetermined number of digits and for specific connections requiring a smaller number of digits a code signal is adapted to be transmitted thereto to indicate that the last digit has been received to enable the register translator to release from the connection after it has effected the appropriate control in the setting up thereof in response to said smaller number of digits.

The invention will be better understood from the following description taken in conjunction with the accompanying drawings comprising Figs. 1–16. These drawings show part of a telephone system of the general kind disclosed in U. S. Patent No. 2,369,071 granted on February 6, 1945 to John E. Ostline, and in U. S. Patent No. 2,272,475 granted on February 10, 1942 to John E. Ostline.

In these drawings Fig. 1 indicates the necessary circuits of the toll line control circuit to enable the invention to be understood.

Figure 1:
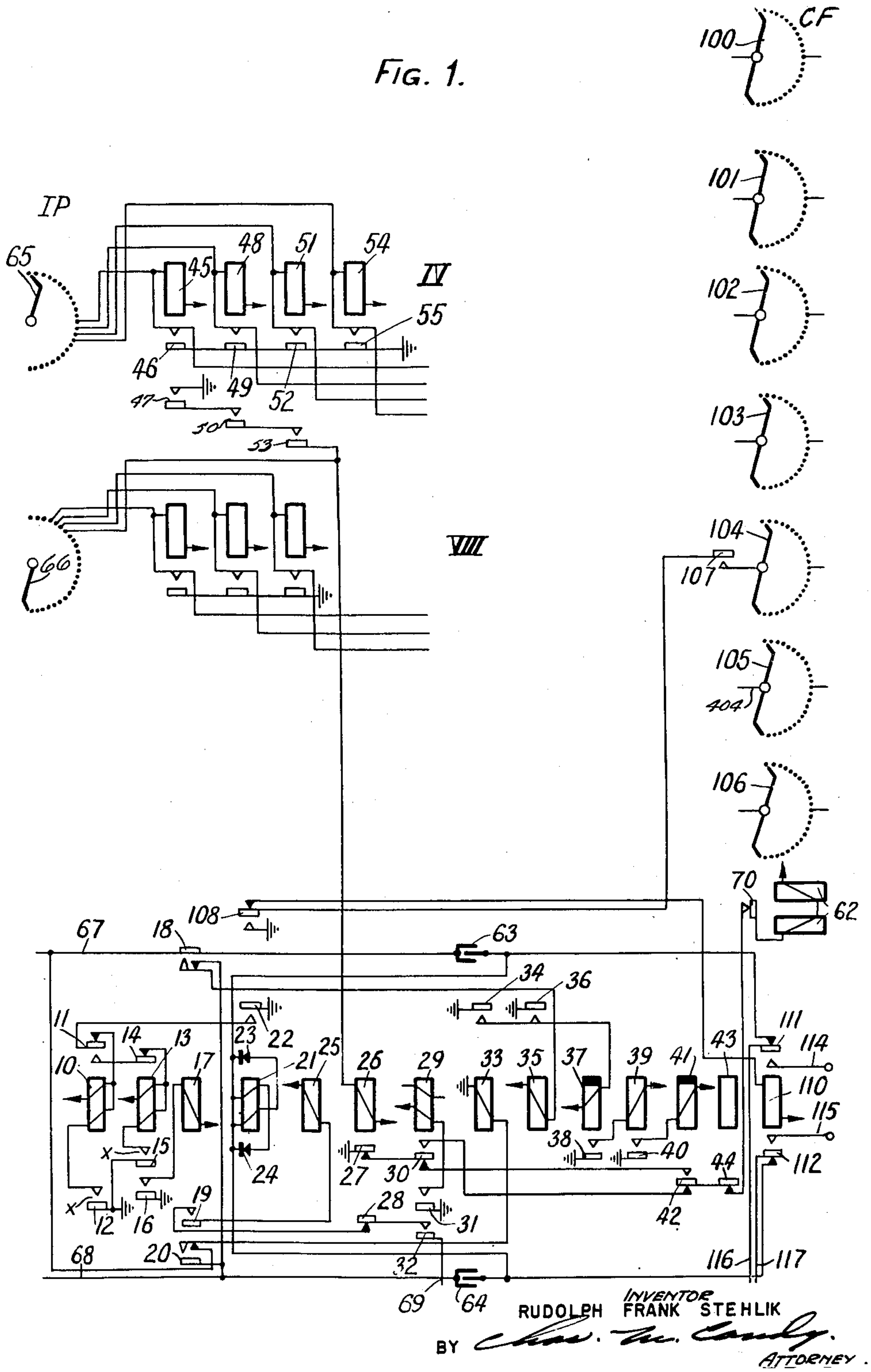
Figure 2:
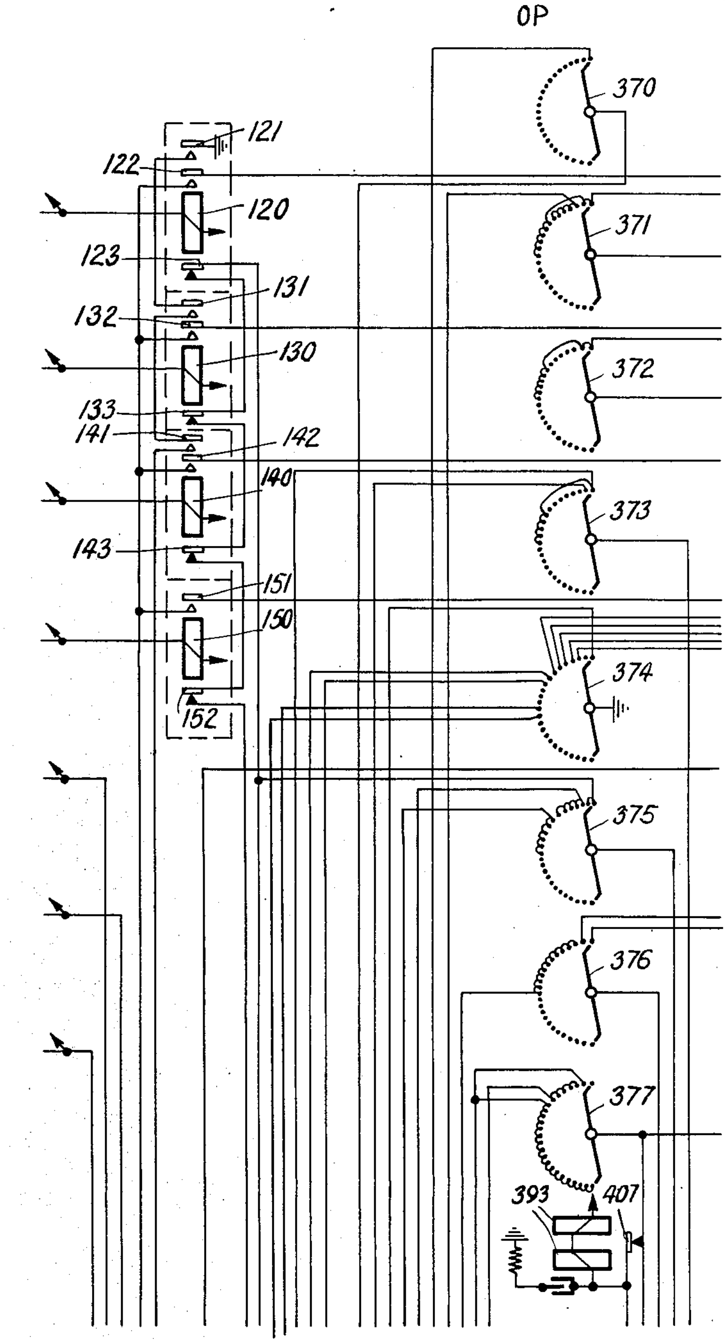
Figs. 2–6 show the circuits of the register-translator or converter which should be arranged as shown in Fig. 7.
Figure 3:
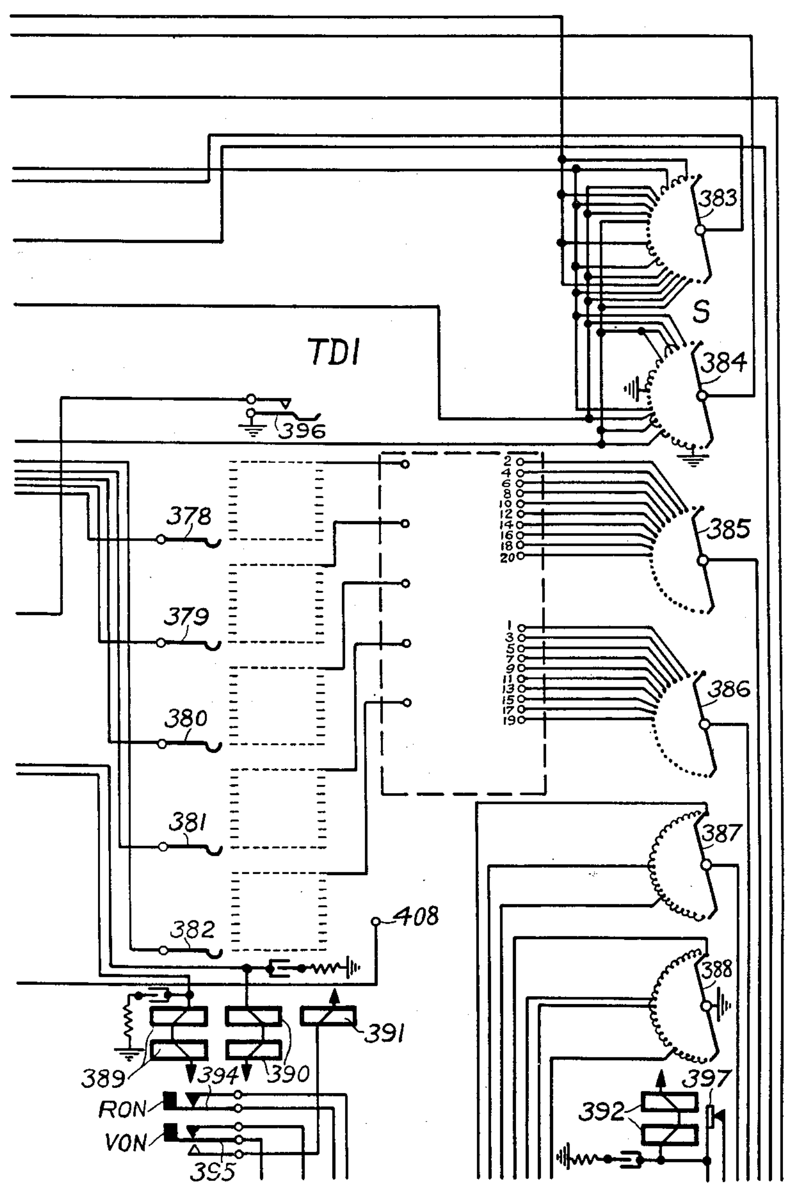
Figure 4:
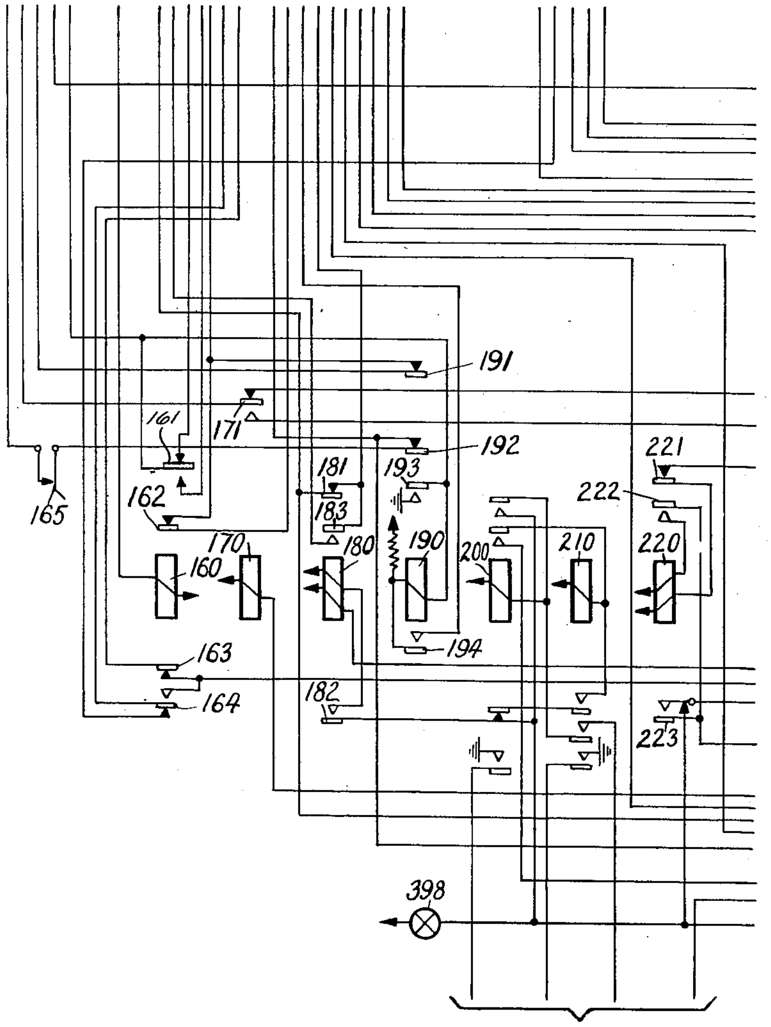
Figure 5:
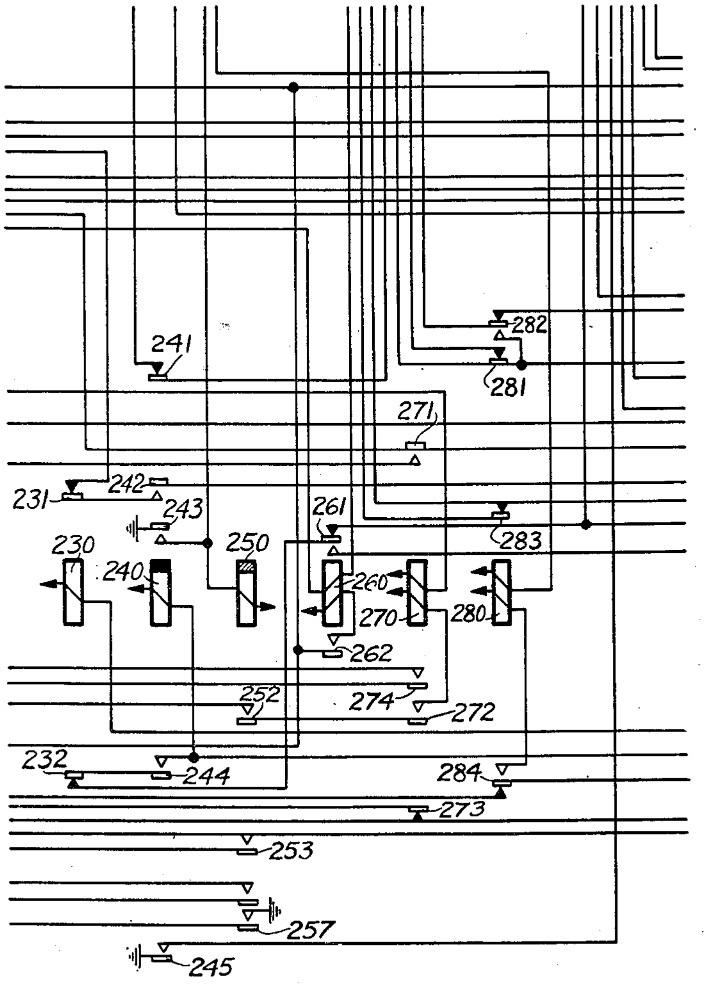
Figure 6:
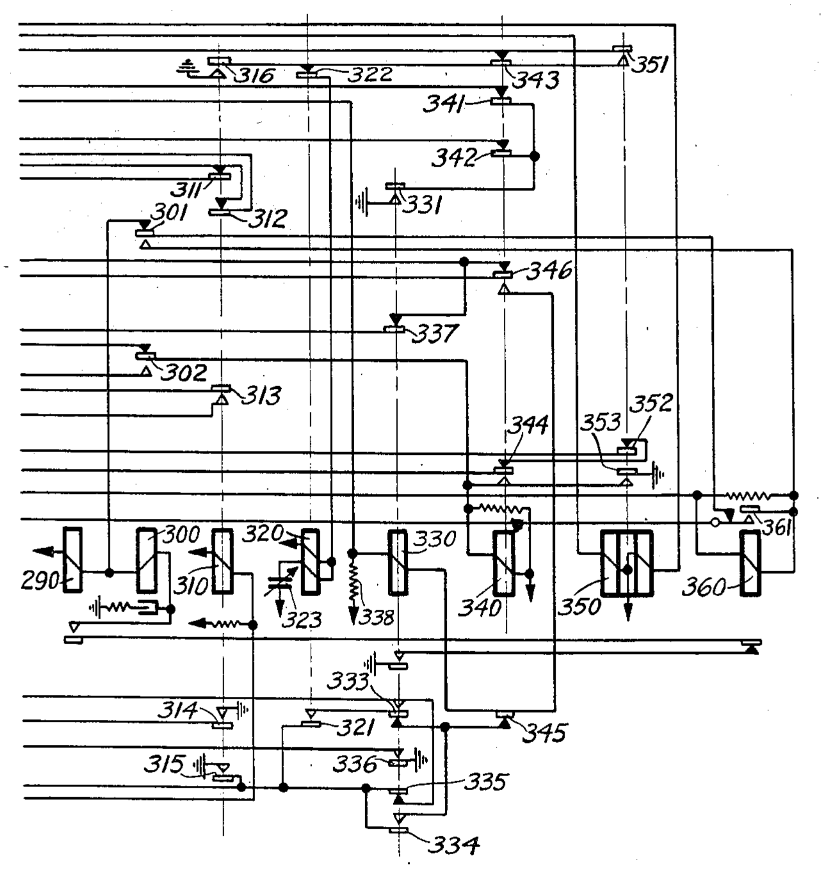

Referring now to Fig. 1 the toll line control circuit is taken into use by the extension of battery over conductor 67 and earth over conductor 68, which causes the operation of relays 33 and 35 respectively which at armatures 34 and 36 close a circuit for the slow-to-release relay 37. Relay 37 at armature 38 closes an obvious circuit for relay 39 which at armature 40 closes an obvious circuit for slow-to-release relay 41. Relay 41 in operating at armature 42 completes a circuit extending from earth at armature 27, armatures 30, 42, 44, interrupter contacts 70, winding of magnet 62 to battery. The wipers of the switch CF are thus rotated in search of an idle register-translator or converter and when this occurs relay 43 operates over a circuit which is not shown and at armature 44 opens the above-traced circuit for the magnet 62. The toll line control circuit is adapted to receive digits in code form from a register-translator at the originating exchange and to store the digits on groups of storage relays of which groups IV and VIII only are shown. The first digits received by the toll line control circuit and which are repeated to the converter, form the called party's number. This will comprise seven digits, of which the first two represent the zone of the called party, the next two the called party's exchange and the last three the called party's number in the exchange.

The code employed comprises a cycle of four impulses for each digit and four storage relays are provided for storing the digit. The arrangements are such that although four impulses are transmitted for each cycle not all the storage relays are operated but only an appropriate combination in accordance with the digit which is to be stored. The impulses are received in the toll line control circuit over conductors 67 or 68, those transmitted over conductors 67 serving to control stepping of the wipers of the switch IP, and also to cause the operation of the appropriate storage relays, while those received over conductor 68, control the stepping of the wipers of the switch IP only. This operation is, in general, the same as that described in the application of J. E. Ostline Serial No. 278,729, filed June 12, 1939, now Patent No. 2,272,475, granted on February 10, 1942, and will not be described in detail. The earth which is transmitted over wipers 65 and 66 is also extended over circuits which are not shown, to wipers 100, 101, 102 and 103 to cause the operation of the appropriate relays of the storage group relays 120, 130, 140 and 150 in accordance with the digits forming the called party's number only.

As will be described later the converter controls the transmission over the junction line of non-decimal digits which are determined by the two zone-designating digits and also causes the remaining five digits of the called party's number to be transmitted without change in order to effect the setting up of the connection and the impulses forming these digits are repeated through the toll line control circuit by relay 110. When the connection has been set up to the called subscriber relay 21 in the toll line control circuit operates in response to an alternating current signal and at armature 22 extends earth over armature 11, upper winding of relay 10 to battery. Relay 10 which is a two-step relay operates its "X" armature 12 only at this time but at the end of the signal it operates fully and at armature 11 prepares a circuit for operating relay 13. This circuit is completed on the operation of relay 21 in response to an alternating current signal which is transmitted when the called party replies. Relay 13 is also a two-step relay and closes its "X" armature 15 only at this stage. At the end of the signal the relay operates fully and armature 16 closes a circuit for relay 17 which at armatures 18 and 20 causes reverse battery supervision to be given.

The next operation of the toll line control circuit comprises the timing of the call and this is begun after a certain grace period when relay 29 operates. Relay 29 in operating locks to earth at armature 31 and at armature 32 closes a circuit from the time-pulse conductor 69 over armatures 28, and 19, winding of relay 25 to battery. Earth impulses at the rate of one every five seconds are transmitted over conductor 69 and repeated by relay 25 to cause the stepping of a switch (not shown) which is adapted to record the time of the call. When the calling party hangs up his receiver at the end of the call relays 33 and 35 release followed by relays 37, 39 and 41. The toll line control circuit remains held, however, due to a circuit which is not shown, and on the release of relay 41, the following circuit is closed: earth, armatures 27, 30 in its operated position, 42, 44, interrupter contacts 70, winding of magnet 62 to battery. The wipers of the switch CF are again stepped but this time in search of an idle printer-controller and when this is found relay 43 again operates to open the above-traced circuit at armature 44. The stored information is now transferred from the toll line control circuit to the printer-controller and when this operation is complete the toll line control circuit is released. The release operations will not be described since they will be understood from the last-mentioned Ostline patent.

If, however, the call which is being set up is a special service call from the operator of the exchange at which the toll line control circuit is located to the central exchange of another zone, the call will not be timed since no charge is to be made, and in addition a record is not made of the call. In order to prevent these two operations it is necessary to prevent relay 25 from being impulsed from conductor 69 and also to prevent the closure of the second hunting circuit for the magnet 62. Now a special service call may be set up by the operator by dialling three digits only and it is arranged that when such a call is being set up a code signal is transmitted to the toll line control circuit which causes the operation of three relays in the fourth storage groups IV in the toll line control circuit. This group of storage relays comprises relays 45, 48, 51 and 54 and it is arranged that relays 45, 48 and 51 are operated. When this occurs earth is extended over armatures 47, 50, 53, winding of relay 26 to battery. Relay 26 in operating at armature 27 prevents the completion of the second hunting circuit for the magnet 62 and at armature 28 prevents the completion of the impulsing circuit to the relay 25. As a result the timing of the call is prevented and no printer-controller is taken into use. Other circuit changes also take place which enable the toll line control circuit to be released immediately the originating operator withdraws her plug from the jack.

It will, of course, be understood that the circuits shown in Fig. 1 are very incomplete, but it is believed that sufficient details have been given in order to enable the invention to be understood in view of the previously mentioned Ostline patents.

Figures 7, 8:
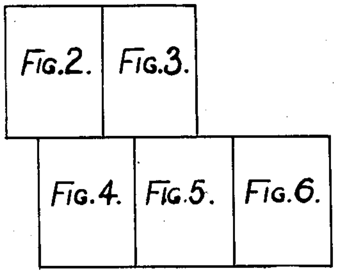
Fig. 8 is a table showing the digit code which is employed.
Figure 9:
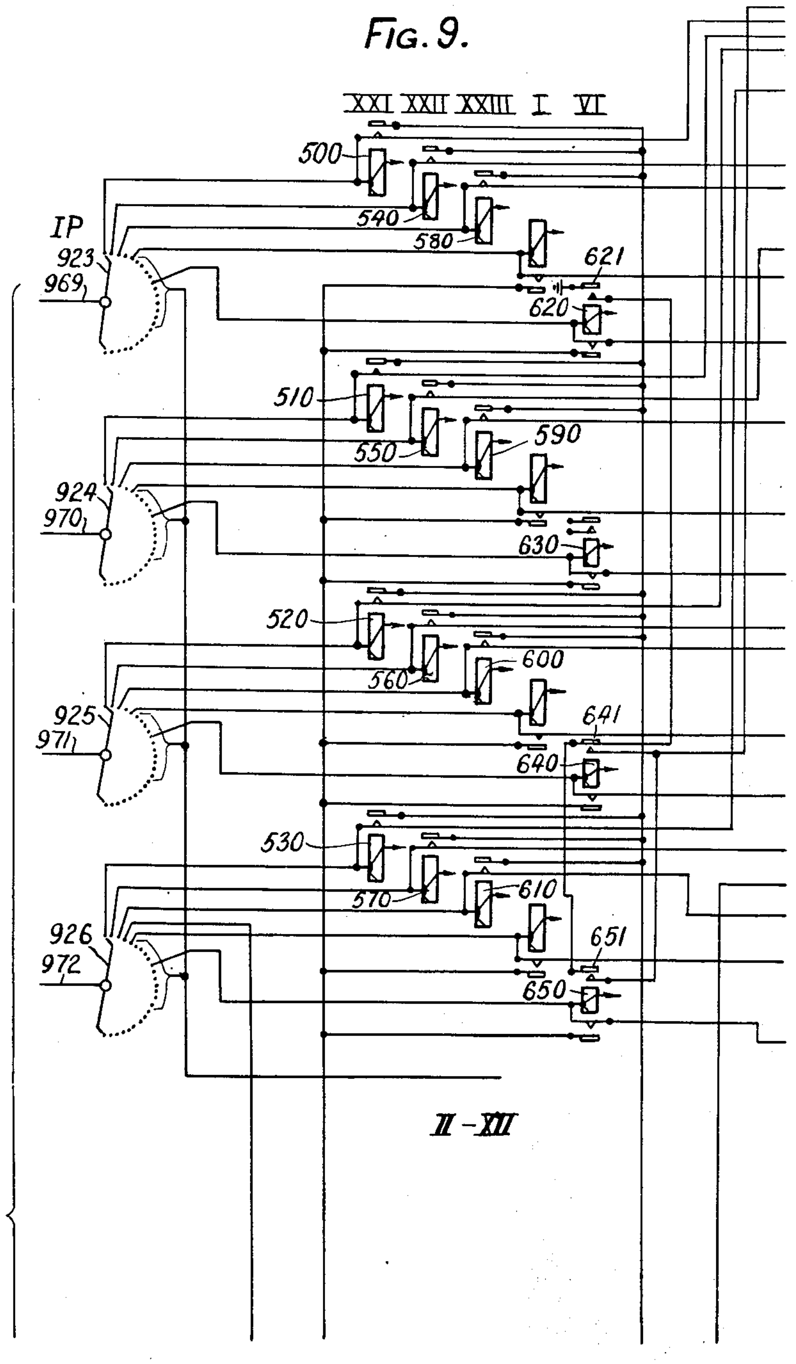
Figs. 9–14 show the circuits of the printer-controller which should be arranged as shown in Fig. 15.
Figure 10:
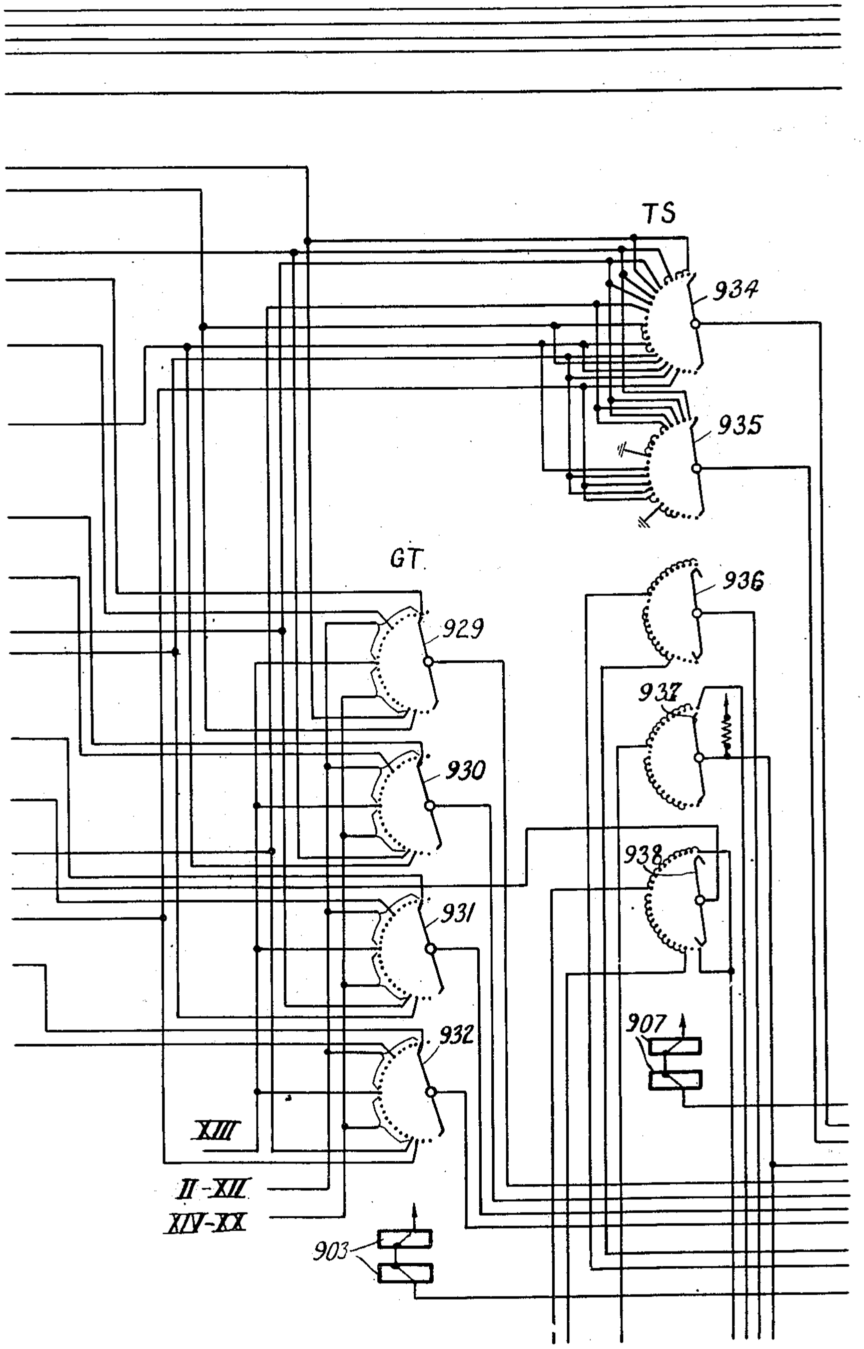
Figure 11:
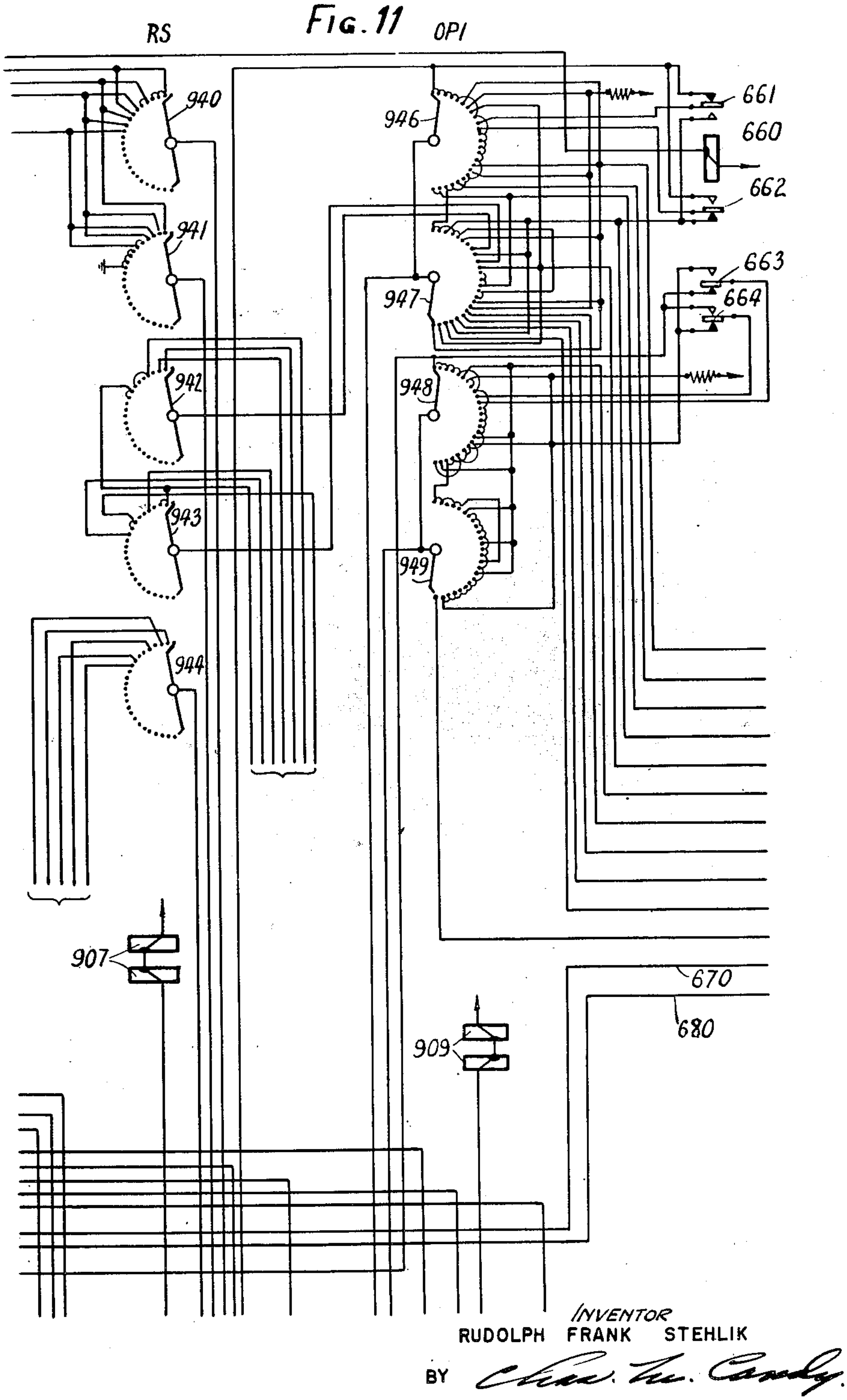
Figure 12:
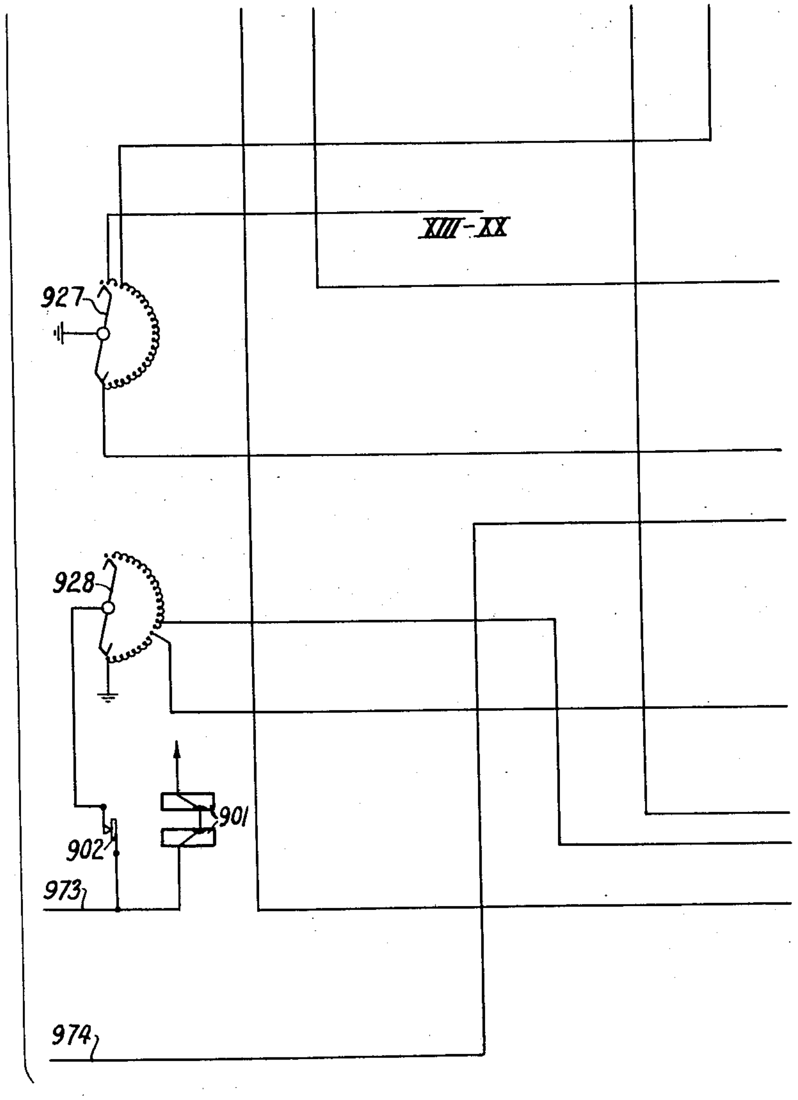
Figure 13:
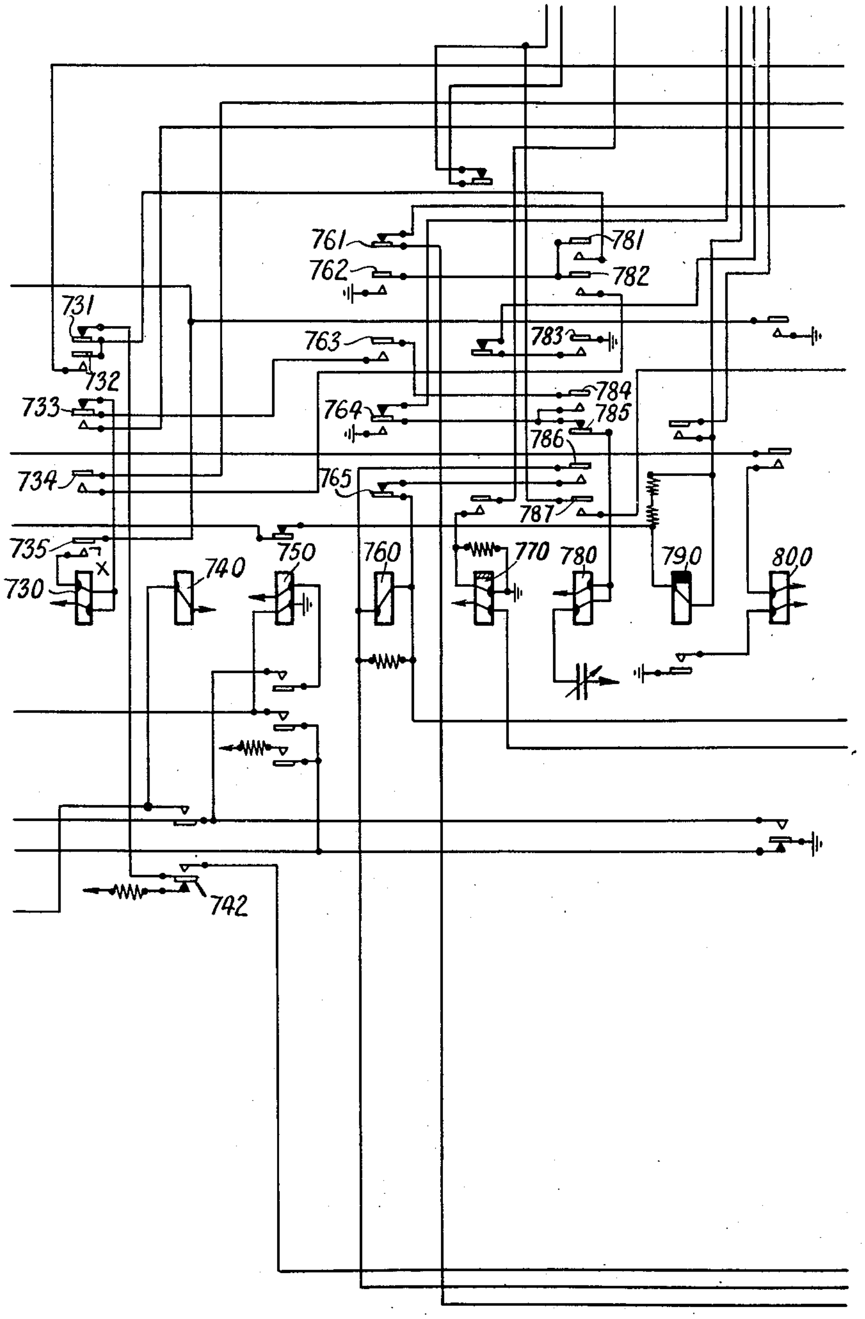
Figures 14, 15:
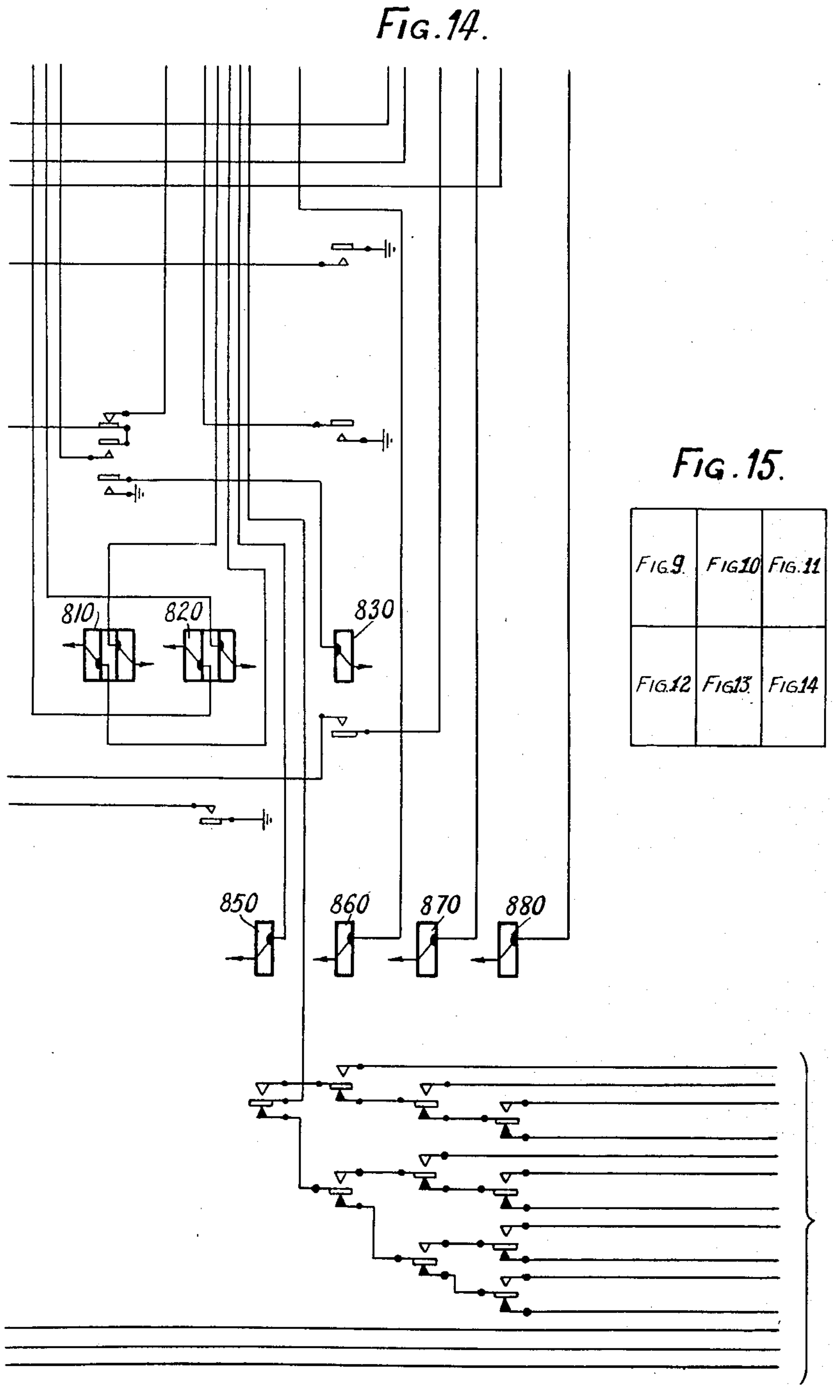

Referring now to the register-translator or converter which is shown in Figs. 2, 3, 4, 5 and 6, which figures should be arranged as shown in Fig. 7 to give a complete circuit, the converter is taken into use from the toll line control circuit by the extension of earth over wiper 196 to cause the operation of relay 310. The following relays are now operated in consequence of the operation of relay 310; relays 240, 260, 250, 230 and 320 (over its upper winding). Relay 320 is a self-interrupting relay owing to its armature 322 and is employed as an impulse-generator, the condenser 323 being connected in series with the lower winding so that the rate of impulsing is capable of being varied.

When the first digit has been transferred from the storage relays in the toll line control circuit to the storage relays 120, 130, 140 and 150 in the converter relay 330 operates on the next energisation of relay 320. Relay 330 is employed particularly for initiating the transmission of impulses from the converter. Its circuit is normally short-circuited and the short-circuit is removed only when the converter and subsequent circuits are ready. In addition relay 330 controls the stepping of a switch in the toll line control circuit in order to effect the successive transfer of the digits from this circuit to the converter and it controls the stepping of the switch OP in the converter. Relay 330 controls the initiation of impulse transmission by placing relay 230 in the converter under the control of the impulsing relay 320. The operation and release of relay 230 in synchronism with relay 320 causes the two-directional switch TD1 to be set vertically in accordance with the first zone-designating digit transferred to the converter and it also causes the switch S to be moved one step for each vertical step of the switch TD1. The switch S by virtue of the connections extending between the bank contacts associated with wipers 383 and 384 and the armatures of the storage relays, acts as a decoding switch and when the number of vertical steps taken by the two-directional switch correspond to the numerical value of the digit stored, relay 350 operates and closes a circuit for relay 340 which on energising opens the circuit for the vertical magnet 389 of the switch TD1. Relay 330 is also released at this time whereupon the switch in the toll line control circuit mentioned above is stepped to the next position and the wipers of the switch OP are stepped to position 2.

The storage relays are now energised in accordance with the second digit and the wipers of the two-directional switch TD1 are rotated into the level in accordance with the numerical value of the second digit in a similar manner to that described above for the vertical magnet. Relay 280 is energised during the setting of the two-directional switch TD1 and releases when this is completed. Relay 330 is now short-circuited over the following circuit: earth at armature 315, armature 273, contact 3 and wiper 375 to resistance 338.

When the equipment at the distant exchange is in a condition to receive impulses from the converter, a momentary alternating current signal is transmitted to the toll line control circuit to cause the operation of relay 21 as previously described which closes armature 108 to cause earth to be extended over armature 107, wiper 104 and bank contact, armature 171 in its rest position, upper winding of relay 270 to battery. Relay 270 locks over armature 272, its locking circuit being opened on the termination of the first impulse series. Relay 270 at armature 273 opens the above-traced short-circuit from around relay 330 to enable impulse transmission from the converter to commence. At this time relay 330 in addition at armature 336 extends earth over armature 284 in its resting position to battery over the winding of relay 170. Relay 170 at armature 171 completes the following impulse-repeating circuit from the converter to the toll line control circuit: earth, armature 245, wiper 387 on any of contacts 2—12 or 14—25, armatures 344, 352, 242, 231, wiper 376 on contact 3, armatures 313, 171, wiper 104, armatures 107, 108, winding of relay 110 to battery. Relay 110 repeats the impulses in the form of alternating current impulses over the junction line conductors 116 and 117. The impulses which are now transmitted from a series of non-decimal impulse trains the number of impulses in these trains being determined by cross-connections extending from the banks associated with wiper 378 to 382 of the switch TD1 and the contacts associated with wipers 385 and 386 of the switch S, this switch acting at this time as a sender control switch. When the appropriate number of impulses have been transmitted relay 340 operates and at armature 344 opens the above circuit.

The number of non-decimal impulse trains normally transmitted is five although the circuit is adapted to transmit less than five. Assuming that five trains are transmitted, the wipers of the switch OP will then be in position 8. With wipers 375 on contact 8, relay 330 is short-circuited from earth at armature 315, armature 181, contact 8 and wiper 375, resistance 338. Earth is also extended over wiper 374 on contact 8, armature 164, interrupter contacts 407, winding of magnet 393 to battery. The wipers of the switch OP are thus stepped to position 9.

The next operation is the transmission of the two exchange-designating digits of the called party and his three-digit directory number. These digits are transmitted without translation and when the equipment at the distant exchange is ready for the reception thereof, a momentary alternating current signal is again transmitted to the toll line control circuit thereby causing the operation of relay 270 in the converter. With relay 270 operated and wiper 374 on contact 9, earth is extended over this wiper, armatures 163, 274, lower winding of relay 180 to battery. Relay 180 operates and at armature 181 opens the above-traced short-circuit for relay 330 and at armature 183 closes a further short-circuit for this relay unless one of the storage relays has been operated when relay 330 operates and initiates the transmission of the impulses. Relay 330 in operating at armature 336 again causes the operation of relay 170 to close the impulse-repeating circuit traced above. In addition relay 330 at armature 331 again closes a circuit for energising the magnet of the previously mentioned switch in the toll line control circuit, this circuit extending from earth at armature 331, armature 341, wiper 373 on contact 9, armatures 191, bank contact and wiper 105 to conductor 404.

The number of impulses in each train is determined by the rotation of wipers 383 and 384 of the switch S in a similar manner to the control of the operation of the vertical and rotary magnets of the switch TD1. When these impulse trains have been transmitted the wipers of the switch OP will be stepped to position 14 whereupon earth is transmitted over wiper 374 on contact 14, armature 161 and its resting contact, winding of relay 190 to resistance battery. Relay 190 at armature 192 opens the circuit of relay 310 which releases to cause the release of the converter, relay 190 releasing on the return to normal of the switch OP when it is short-circuited by earth over wiper 374 and armature 194.

The majority of zones in the Belgian network for which the circuits have been designed, are of 100,000 line capacity and these are indicated by a two digit zone prefix while the two remaining zones are of a 1,000,000 line capacity and in order to maintain uniformity in the numbering scheme such zones have a single zone designating digit, the second digit serving both as a zone digit and as the first of the two exchange designating digits.

Thus when a particular zone is designated by one digit only, the first of the exchange designating digits is employed for setting the switch TD1 in a rotary direction, this digit being also transmitted unchanged for routing purposes. The circuits shown in the drawings are arranged to operate in a system in which two zones only have single designating digits, these digits being 2 and 3. On these levels the shaft springs 396 close to operate relay 160. Relay 160 at armature 161 changes the release circuit for controlling the relay 190 in position 13, rather than in position 14, of the wiper 374 of the switch OP. Also the relay R160 at armature 162 opens the circuit extending over wiper 373 to conductor 404 so that the switch in the toll line control circuit which controls the operation of the storage relays is prevented from stepping to position 3 at this time. At armature 163 relay 160 opens a point in the circuit extending from contact 9 associated with wiper 374 to relay 180 and at armature 164 and its resting contact relay 160 opens the self-interrupting circuit for the magnet 393 which was completed with wiper 374 on contact 8. Finally at armature 164 and its operated contact, relay 160 prepares a point in the circuit of relay 180 which is now closed when wiper 374 is on contact 8. The effect of these operations is that the first decimal digit is transmitted when the wipers of the switch OP are in position 8 i. e. while the second digit is still stored on the storage relays. Thus, the second, third, fourth, fifth and sixth digits are transmitted unchanged with the wipers of the switch OP in positions 8, 9, 10, 11 and 12. At the end of the sixth digit the wipers are stepped to position 13 where earth is extended over wipers 374 on contact 13, armature 161 and its operated contact, winding of relay 190 to battery. Relay 190 operates and causes the release of the converter as previously described.

If a special service call to another zone is being set up under the control of an operator, the converter must be released at an earlier stage since seven digits are unnecessary for setting up calls of this type. The circuits are arranged to deal with special service calls requiring three digits only but it will be understood that more than three digits are at times necessary. In actual fact in the Belgian network for which the circuits shown were designed, inter-zone special service require from 3 to 5 digits in all combinations of one zone digit and two numerical digits to two zone digits and three numerical digits. In order to effect the release of the converter a code-signal is transmitted in the present example after the third digit, as described in connection with the toll line control circuit, which signal is repeated from the toll line control circuit to the converter to cause the operation of relays 120, 130 and 140. A circuit is now closed as follows: earth, armatures 121, 131, and 141, winding of relay 190 to battery. The release of the converter follows the operation of relay 190 as previously described.

With regard to the printer-controller shown in Figs. 9–14, this is substantially similar to the printer-controller shown in Figs. 15 to 29, inclusive, of the last-mentioned Ostline patent. A brief description will therefore be given of the general operation of this circuit and only those operations which are of interest from the point of view of the present invention will be given in detail.

The printer-controller is taken into use from the toll line control circuit when the called party replaces his receiver by the extension of earth over conductor 974 which operates relay 790 followed by relay 800. The information stored in the toll line control circuit in coded form is then transferred over conductors 969—972 and wipers 923—926 of the switch IP to groups of storage relays in the printer-controller as described in the last-mentioned Ostline patent. Groups XXI, XXII, XXIII, I and VI only are shown in detail. The various items of information are stored on the relay groups as follows:

Calling party's number, groups I to V.
Called party's number, groups VI to XII.
Charging rate, group XXI.
Duration of call, groups XXII and XXIII.

In addition the date and time is obtained from equipment other than the toll line control circuit and is stored on groups XIII to XX. The charging rate is the first item to be received and this is followed by the duration of the call and then by the calling party's number and called party's number, the switch IP stepping from contact to contact as the digits are received. With wiper 927 on contacts 2 and 3, the equipment which gives the date and time is connected up and the information stored. With wiper 927 on contact 4 i. e. after the charging rate and duration have been stored, the pulsing relay 780 operates. This relay is self-interrupting and serves to drive the various switches in the circuit with the exception of the switch IP which is driven from the toll line control circuit over conductor 973. The operation of relay 780 at this time serves to cause the operation of the switch RS which acts as a decoding switch and is stopped by the operation of relay 810 when the wipers have taken a number of steps equivalent to the numerical value of the digit which represents the charging rate. Relay 810 operates relay 830. Over wiper 944 one of a group of relays (not shown) is operated to select one of three two-directional calculating switches (not shown) and also in certain cases to select certain only of the wipers of the selected switch. This operation is described in detail in the last-mentioned Ostline patent. Over wipers 943 and 944 a circuit is prepared for operating the appropriate magnets in the printer in order to cause the charging rate to be printed.

On the operation of relay 810 the switch TS is caused to step in synchronism with the vertical and then with the rotary magnet of the selected calculating switch, the switch TS acting as a decoding switch as regards the digits representing the duration of the call, the selected calculating switch being set as regards its vertical movement in accordance with the tens digit and as regards its rotary movement in accordance with the units digit. The operation of the magnets is controlled over conductors 670 and 680. The position taken up by the selected wipers of the switch gives the total cost of the call and by means of cross-connections extending between the switch banks and conductors leading to the printer magnets, it is possible to print the total cost. Calls for which the charging rate is the lowest are not charged on a time basis and hence the charge for all calls on this rate are the same and equal to the rate. In this case no calculating switch is taken into use but a relay is operated to cause connections to be made to the appropriate printing magnet for printing the cost of the call.

The operation of relay 830 also causes a printer unit to be associated with the printer-controller whereupon relay 760 operates to initiate the printing operation. The printer unit comprises two printing mechanisms in the form of electromagnetically operated typewriters. One of the printers is adapted to print the various items on a detachable ticket while the other prints the items in a continuous line, each item being separated from the next by a star. On the next operation of relay 780 the following circuit is closed: earth, armatures 762, 781, 731 to armatures 742. Relay 740 will be operated as described in the last-mentioned Ostline patent if the subscriber wishes to be informed of the cost of the call. The above circuit is then extended over armature 742 to the conductor which extends to the star-printing magnet in the ticket-printer in order that an indication of this requirement may be made. If no such indication is to be made armature 742 will not be operated and no circuit operation takes place. Also on the same operation of relay 780, relay 730 is energised as follows: earth, armatures 764, 784, 763, 733, lower winding of relay 730 to battery. Relay 730 is a two-step relay and closes its "X" armature 735 only at this time. When relay 780 releases, relay 730 operates fully and at armature 731 opens the circuit of the star-printing magnet.

On the next operation of relay 780 three circuits are closed, one for extending earth to wipers 946 and 947 of the switch OPI, another for energising magnet 909 of the switch OPI, and a third for extending earth to wipers 948 and 949. These three circuits control the printing of the various items of information on the ticket and record strip. The circuit for extending earth to wiper 948 and 949 is as follows: earth, armatures 762, 782, 734, wipers 948 and 949. The circuit for magnet 909 extends as follows: earth, armatures 764, 784, 763, 733, winding of magnet 909 to battery. The circuit for extending earth to wipers 946 and 947 is as follows: earth, armatures 762, 781, 732 to wipers 946 and 947. The wipers of the switch OPI thus take one step each time relay 780 releases while the stepping of the switch GT is dependent upon the connections from the banks associated with wipers 948 and 949 of the switch OPI. Finally the printing operation is controlled over wipers 946 and 947 of the switch OPI.

The calling party's number is the first to be printed and this is stored on the relay groups I to V. The first digit which is stored on group I is transferred over wipers 929 to 932 of the switch GT on contact 2 (the normal position) to the group of relays 850 to 880. This group of relays acts as a decoder and earth is extended over wiper 946 on contact 1 to the contact pyramid associated with these relays to cause the operation of the appropriate printing magnet. This operation occurs when relay 780 is operated. On the release of the relay the wipers of the switch GT are stepped to contact 3 and those of the switch OPI are stepped to contact 2. In addition earth is removed from the wipers of the switch OPI.

The same operations are performed for each digit and when the complete number has been printed the wipers of the switch GT are stepped to position 7 while those of the switch OPI are stepped to position 6. In this position the shift mechanism of the ticket-printer is operated over wiper 946 while the star-printing magnet of the record strip printer is operated over wiper 948. The switch OPI thereupon steps to position 7 and then to position 8, no operation taking place in position 7 to give the shift mechanism sufficient time to operate. During the stepping from position 6 to position 8, the wipers of the switch GT remain in position 7.

The next information to be printed is the called party's number which on an inter-zone call comprises the digit 0, one or two digits representing the zone of the called party, two digits representing the exchange of the called party and finally four of three digits respectively representing the called party's number in his own exchange. On the next operation of relay 780 therefore earth is extended over wiper 946 on contact 8 to the appropriate conductor to cause the printing of the digit 0 and the wipers of the switch OPI are then stepped to position 9. No operation of the switch GT occurs at this time.

With the wipers of the switch GT in position 7 however the first of the zone digits is transferred to relays 850 to 880 and when wiper 946 reaches contact 9 earth is again extended over the contacts of these relays to cause the operation of the appropriate printing magnet. The switch OPI is stepped to position 10 and the switch GT to position 8.

As mentioned above a zone may be designated by one or two digits and in order to give an indication on the ticket as to which digits are zone digits, it is arranged that a period is printed after the zone digit or digits. Now since there may be one or two zone digits, the period will occur in different positions and relay 660 is provided to take care of this.

In the system for which the circuit has been designed, there are two zones only designated by a single digit, the two digits being 2 and 3. Further no two digit zones have the digits 2 or 3 for this first digit. Now the digit 2 will be represented by the operation of relays 620 and 640 of group VI and the digit 3 by the operation of relays 620 and 650. When either of these combinations occurs, the following circuit is closed: earth, armatures 621, 641, or 651, winding of relay 660 to battery. Relay 660 is thus operated on all calls to one-digit zones.

Returning now to the printing operation and assuming first that the call is to a two digit zone, with wiper 946 of the switch OPI on contact 10, earth is extended over the wiper, armature 661 in its resting position to the contact pyramid associated with relays 850 to 880 to cause the printing of the second zone digit. The switch OPI is then stepped to position 11 while the switch GT is stepped to position 9 over wiper 948 and armature 663 in its resting position. Over wiper 946 in position 11 earth is extended over armature 662 in its resting position to the appropriate conductor to cause a period to be printed whereupon the switch OPI is stepped to position 12. The switch GT remains in position 9 during this operation since armature 664 is in its resting position. With the switch OPI in position 12 and the switch GT in position 9 the first of the exchange digits is printed.

If, however, the call is to a one-digit zone, then with wiper 946 of the switch on contact 10, earth is extended over this wiper, and armature 661 in its operated position to the appropriate conductor for causing the period to be printed after the first zone digit whereupon the switch is stepped to position 11. The switch GT remains in position 8 since the armature 663 is in its operated position. In position 11 earth is extended over wiper 946 and armature 662 in its operated position to the contact pyramid to cause the first exchange digit to be printed whereupon the switch OPI is stepped to position 12 while the switch GT is stepped to position 9 since armature 664 is in its operated position.

The remainder of the printing operation and the release of the printer-controller takes place in a manner similar to that described in the last mentioned Ostline patent and since it does not concern the present invention no detailed description thereof will be given.

The fundamental arrangement of the register-translator or converter shown in Figs. 2 to 6, inclusive, utilizing a single digit register which is successively operated from registers in a toll line control circuit to register the successive digits of a called number and to control the production of both translated and non-translated digits, as well as the sending thereof, is disclosed and claimed in the copending application of Rudolph F. Stehlik, Serial No. 743,965, filed April 25, 1947.

I claim:

1. In a telephone system, a register sender including a single digit register and a digit sender, means for transmitting a series of digits to said register sender, means for successively operating said digit register to register successive ones of said digits, means governed in accordance with the first N−1 of said digits registered by said digit register for selectively determining whether the Nth of said digits to be registered by said digit register is to be sent, means governed in accordance with the first N of said digits registered by said digit register for selectively establishing one or more routing digits, and means for operating said digit sender to send said established routing digit or digits and then selectively to send the Nth of said digits registered by said digit register depending upon said determination and then to send the N+1, etc., of said digits registered by said digit register.

2. In a telephone system divided into zones having both N and N−1 digit designations, lines in each of said zones having M digit designations, automatic switching apparatus operative to set up connections between said lines, a register sender including a single digit register and a digit sender, means for transmitting a series of digits to said register sender, means for successively operating said digit register to register successive ones of said digits, means governed in accordance with the first N−1 of said digits registered in said register sender for selectively determining whether the Nth of said digits to be registered by said digit register is to be sent, means governed in accordance with the first N of said digits registered by said digit register for selectively establishing one or more routing digits, means for operating said digit sender to send said established routing digit or digits and then selectively to send the Nth of said digits registered by said digit register depending upon said determination and then to send the following M of said digits registered by said digit register, and means governed by said digits sent by said digit sender for selectively operating said switching apparatus.

3. In a telephone system, a register sender including a single digit register and route mechanism and a digit sender, means for transmitting a series of digits to said register sender, means for operating said digit register to register a first of said digits, means responsive to said operation of said digit register for imparting a primary setting to said route mechanism, means responsive to said primary setting of said route mechanism for releasing said digit register, means for reoperating said digit register to register a second of said digits, means responsive to said reoperation of said digit register for imparting a secondary setting to said route mechanism, means governed by said primary and secondary settings of said route mechanism for operating said digit sender to send a predetermined routing digit or digits and then an additional digit corresponding to said second digit registered in said digit register, and means responsive to operation of said digit sender to send said additional digit for releasing said digit register.

4. In a telephone system, a register sender, means for seizing said register sender, means for transmitting to said register sender a series of X digits and then a release signal or a series of Y digits, where X and Y are fixed numbers and X is smaller than Y, means responsive to the reception of the digits in a series by said register sender for operating said register sender to send digits in accordance with said series, means responsive jointly to operation of said register sender to send digits in accordance with said X series of digits and to the reception of said release signal by said register sender for releasing said register sender, and additional means responsive to operation of said register sender to send digits in accordance with said Y series of digits for releasing said register sender.

5. In a telephone system, a register sender including a code register and a numerical sender, means for seizing said register sender, means for transmitting to said register sender a series of X digits in code and then a release signal in code or a series of Y digits in code, where X and Y are fixed numbers and X is smaller than Y, means for registering the code digits in a series and said code release signal in said code register, means governed by said code register for operating said numerical sender to send digits in accordance with a registered series of code digits, means responsive jointly to operation of said numerical sender to send digits in accordance with said X series of code digits registered in said code register and to the registration of said code release signal in said code register for releasing said register sender, and additional means responsive to operation of said numerical sender to send digits in accordance with said Y series of code digits registered in said code register for releasing said register sender.

RUDOLPH FRANK STEHLIK.

REFERENCES CITED

The following references are of record in the file of this patent:

UNITED STATES PATENTS

| Number | Name | Date |
|---|---|---|
| 1,901,156 | Gillings et al. | Mar. 14, 1933 |
| 1,903,019 | Wright et al. | Mar. 28, 1933 |
| 2,099,616 | Muck et al. | Nov. 16, 1937 |
| 2,108,140 | Patterson et al. | Feb. 15, 1938 |
| 2,207,519 | Pfannschmidt | July 9, 1940 |
| 2,218,630 | Topfer | Oct. 22, 1940 |
| 2,266,215 | Kesten | Dec. 16, 1941 |
| 2,404,466 | Taylor et al. | July 23, 1946 |
| 2,409,063 | Ostline | Oct. 8, 1946 |
| 2,421,919 | Avery | June 10, 1947 |
| 2,431,313 | Den Hertoz | Nov. 25, 1947 |
| 2,447,494 | Deakin | Aug. 24, 1948 |

FOREIGN PATENTS

| Number | Country | Date |
|---|---|---|
| 532,729 | Great Britain | Jan. 30, 1941 |